United States Patent [19]

Takeuchi et al.

[11] 3,981,830
[45] Sept. 21, 1976

[54] PROCESS FOR PRODUCING CHEMICALLY CROSSLINKED POLYETHYLENE-POLYBUTADIENE

[75] Inventors: Yasumasa Takeuchi; Takehiko Ikeda, both of Yokohama; Akira Sekimoto, Kamakura; Takashi Hayashi, Gifu; Toshimi Sasaki; Sabulo Atsumi, both of Anjo, all of Japan

[73] Assignees: Japan Synthetic Rubber Co., Ltd.; MTP Kasei Co., Ltd., both of Japan

[22] Filed: June 27, 1975

[21] Appl. No.: 590,910

Related U.S. Application Data

[63] Continuation of Ser. No. 428,637, Dec. 26, 1973, abandoned.

[30] Foreign Application Priority Data

Dec. 30, 1972    Japan.................................. 48-3203

[52] U.S. Cl. ...................... 260/2.5 HA; 260/2.5 H; 260/889
[51] Int. Cl.² ............................................. C08J 9/00
[58] Field of Search............ 260/2.5 HA, 889, 2.5 H

[56] References Cited
UNITED STATES PATENTS

| 3,586,645 | 6/1971 | Granger et al. ...................... 260/2.5 |
| 3,651,183 | 3/1972 | Hosoda et al. ......................... 264/54 |
| 3,709,806 | 1/1973 | Minami et al. ................... 204/159.2 |

*Primary Examiner*—Richard B. Turer
*Attorney, Agent, or Firm*—Ladas, Parry, Von Gehr, Goldsmith & Deschamps

[57] ABSTRACT

A process for producing a chemically crosslinked polyethylene foam, which comprises heating a polyethylene composition consisting essentially of 97 to 50 % by weight of polyethylene, 3 to 50 % by weight of polybutadiene having a 1,2-addition unit content of at least 70 %, an intrinsic viscosity $[\eta]$ of at least 0.7 dl/g (as measured in toluene at 30°C), at least one blowing agent and at least one crosslinking agent to foam and crosslink said polyethylene composition. The above process can be carried out with a smaller amount of crosslinking agents without expensive crosslinking equipment, and the foam obtained by this process has improved physical properties.

14 Claims, No Drawings

PROCESS FOR PRODUCING CHEMICALLY CROSSLINKED POLYETHYLENE-POLYBUTADIENE

This is a continuation of application Ser. No. 428,637 filed Dec. 26, 1973 and now abandoned.

The present invention relates to a process for producing a chemically crosslinked polyethylene foam. More particularly, the present invention relates to a process for producing a chemically crosslinked polyethylene foam, which comprises heating a polyethylene composition consisting essentially of polyethylene, high molecular weight polybutadiene having a 1,2-addition unit content of 70 % or higher (referred to hereinafter as 1,2-polybutadiene), a blowing agent and a crosslinking agent to foam and crosslink said polyethylene composition.

In general, polyethylene has too low a melting viscosity, so the bubbles resulting from the decomposition of blowing agent are escaped away in the foaming procedure. Therefore, no polyethylene foam of a high expansion rate can be obtained. Accordingly, for the purpose of obtaining a polyethylene foam of a low density, there have been proposed various processes for controlling the melting viscosity of a polyethylene, such as a process in which a rubber is added to the polyethylene, a process in which a partial crosslinking is effected with organic peroxides, electron rays, or the like before foaming.

Crosslinked foams have excellent physical properties such as tensile strength, elongation, heat resistance, resistance to chemicals and the like, as compared with uncrosslinked foams. On the contrary, crosslinked foams have drawbacks that expensive crosslinking agents or expensive crosslinking equipments are required, and that an extremely long period of time is required for crosslinking.

The present inventors have found that in the production of chemically crosslinked foams of polyethylene the addition of a high molecular weight 1,2-polybutadiene to polyethylene enables a very reasonable production of polyethylene foams.

An object of the present invention is to provide a process for producing chemically crosslinked polyethylene foams.

Another object of the present invention is to provide a process for producing chemically crosslinked polyethylene foams with a smaller amount of crosslinking agents, said foams being capable of vulcanizing in a short period of time.

A further object of the present invention is to provide a process for producing chemically crosslinked polyethylene foams having improved physical properties.

Other objects and advantages of the present invention will become apparent from the following description.

According to the present invention, there is provided a process for producing a chemically crosslinked polyethylene foam which comprises heating a polyethylene composition consisting essentially of 97 to 50 % by weight of at least one polyethylene, 3 to 50 % by weight of 1,2-polybutadiene having a 1,2-addition unit content of 70 % or higher and an intrinsic viscosity $[\eta]$ of 0.7 dl/g or higher (as measured in toluene at 30°C), at least one blowing agent and at least one crosslinking agent to foam and crosslink said polyethylene composition.

1,2-Polybutadiene used in the present invention is a high molecular weight one having an intrinsic viscosity $[\eta]$ of at least 0.7 dl/g, preferably at least 1.0 dl/g (as measured in toluene at 30°C). When a low molecular weight 1,2-polybutadiene having an intrinsic viscosity of less than 0.7 dl/g is used, the polyethylene composition has too low a melting viscosity to give an excellent foam and the resulting foam is inferior in physical properties. The 1,2-addition unit content of the 1,2-polybutadiene is at least 70 %, preferably at least 85 %.

The 1,2-polybutadiene may have any crystallinity. However, 1,2-polybutadiene of too high a crystallinity has too high a melting point, which may cause problems in processability at mixing it with polyethylene. When amorphous 1,2-polybutadiene is used, the foam obtained are not satisfactory in some physical properties, for example, tensile strength, tear strength, hardness and the like. 1,2-Polybutadiene having a crystallinity of 10 to 30 % has a suitable melting point and can be used most preferably from the viewpoint of processability and physical properties of the resultant.

The amount of 1,2-polybutadiene used is 3 to 50 % by weight based upon the total weight of the 1,2-polybutadiene and polyethylene. When the amount is less than 3 % by weight, substantially no effect of the present invention can be obtained. An amount of up to 50 % by weight is sufficient to obtain the effect of the present invention. When the amount is more than 50 % by weight, the resulting foam is too hard.

The term "polyethylene" used herein means not only homopolymer of ethylene but also copolymers of ethylene.

The polyethylene used in the present invention includes, for example, polyethylene such as high density polyethylene, medium density polyethylene, low density polyethylene or the like and modified polyethylene such as chlorinated polyethylene, chlorosulfonated polyethylene or the like. In addition, ethylene-copolymer having a small amount of comonomer may also be employed. They may be used alone or in combination of two or more.

The blowing agents used in the present invention include any conventional organic and inorganic blowing agents.

As the organic blowing agents, there may be exemplified nitroso type blowing agents, azo type blowing agents, or aromatic hydrazide type blowing agents and they include, for example, azodicarbonamide, diazoaminoazobenzene, dinitrosopentamethylene tetramine, N,N'-dimethyl-N,N'-dinitroso terephthalatimide, p,p'-oxy-bis(benzenesulfonyl semicarbazide), azobis(isobutyronitrile), toluenesulfonyl semicarbazide, p,p'-oxy-bis(benzenesulfonyl hydrazide), p,p'-diphenyl bis(sulfonyl hydrazide), toluenesulfonyl hydrazide, benzenesulfonyl hydrazide, m-benzene-bis(-sulfonium hydrazide) and the like. The inorganic blowing agents include, for example, sodium bicarbonate, ammonium carbonate, ammonium chloride, ammonium nitrate and the like. These blowing agents may also be used in admixture of two or more or in combination with various conventionally used blowing promoter.

The crosslinking agent used in the present invention may be any substance which is thermally decomposed to liberate a radical and, for example, peroxides, azide type compounds or azo type compounds may suitably be used. Examples of peroxides include dicumyl peroxide, 2,5-dimethyl-di(tert-butyl peroxy) hexane, 2,5- dimethyl-2,5-di(tert-butyl peroxy)hexane, benzoyl peroxide, and the like, and examples of azide type compounds include polysulfonazides such as 1,7-heptane bissulfonazide, 1,10-decane bissulfonazide, 1,11-undecane bissulfonazide, and the like, or azide formates such an n-octadecyl azide formate, tetramethylene bisazide formate, m-phenylene diazide formate or aromatic polyazides such as m-phenylene diazide, 2,4,6-triazido benzene and the like, and examples of azo type compounds include those listed above as said blowing agents.

These polyethylene, 1,2-polybutadiene, blowing agent and crosslinking agent may be admixed in any method, for example, a method in which the blowing agent and the crosslinking agent are added to a mixture of the polyethylene and the 1,2-polybutadiene, or a method in which the blowing agent and the crosslinking agent are added to any one of the polyethylene and the 1,2-polybutadiene, or both of them, and the two are admixed, and the like. For mixing these components, there may be employed a roll, a Banbury's mixer, a high speed mixer (for instance, a super mixer, a Henschel mixer and the like), a screw extruder or other kneading mills. For the preliminary admixing of polyethylene with 1,2-polybutadiene, there may be employed a mechanical admixing method by use of a roll, a Banbury's mixer, a high speed mixer (for instance, a super mixer, a Henschel mixer and the like), a screw extruder and other kneading mills or a solution blending method using the polymer solution mixture.

In the mixing procedure, it is also, of course, possible to incorporate various fillers, reinforcing agents, pigments and modifying agents into the polyethylene composition of this invention depending upon the objects and applications thereof.

According to the present invention, a great rationalization can be made on the compounding cost and the manufacturing procedure, for example, the amount of expensive chemical crosslinking agent used can be reduced markedly and the time required for crosslinking can also be markedly shortened in the production of chemically crosslinked polyethylene foam. In addition, physical properties of the foam can be improved. Thus, the chemically crosslinked foam can be produced very effectively.

The present invention is explained in further detail referring to Examples hereinafter. However, the Examples are not by way of limitation but by way of illustration.

In the following examples, the micro-structural composition of polybutadiene was measured by the infrared absorption spectrum method of D. Morero et al. [Chemie et Ind., 41, 758 (1959)]. The crystallinity was determined by the density measurement method in which the following equation was used:

$$\frac{1}{d} = \frac{X}{d_{cr}} + \frac{1-X}{d_{am}}$$

where $d$ : density of the specimen measured at 20°C $d_{cr}$ : density of 1,2-polybutadiene having a crystallinity of 100 %

$d_{am}$ : density of 1,2-polybutadiene having a crystallinity of 0 %

X : crystallinity in per cent

The value of $d_{cr}$ used was that of the crystalline 1,2-polybutadiene calculated by Natta from X-ray experiments to be 0.963 [G. Natta: J. Polymer Sci., 20, 251 (1956)]. The value of $d_{am}$ used was 0.892 or the density of the 1,2-polybutadiene obtained by the synthesizing process proposed in U.S. Pat. No. 3,498,963 and which was found completely amorphous by X-ray analysis. In the Examples, parts are by weight unless otherwise specified.

EXAMPLE 1

Polyethylene having a melt index of 4.0 and a density of 0.917 g/cm³ and 1,2-polybutadiene having a 1,2-addition unit content of 92 %, an intrinsic viscosity [η] of 1.74 dl/g as measured in toluene at 30°C and a crystallinity of 25 % (referred to hereinafter as 1,2-polybutadiene Ⓐ) were mixed according to the compounding formulation shown in Table 1 by means of a 18 inch roller (front roll temperature: 100°C; rear roll temperature: 95°C), and the resulting mixture was subjected to crosslinking and foaming under the foaming conditions shown in Table 1. The state and physical properties of the crosslinked foam obtained are shown in Table 1 (The physical properties were measured according to the procedure of JIS K 6767A (JIS is an abbreviation of Japan Industrial Standards).

Table 1

| Item | Run Nos. | |
|---|---|---|
| Compounding formulation (parts) | 1 | 2 |
| Polyethylene | 100 | 90 |
| 1,2-Polybutadiene Ⓐ | 0 | 10 |
| Blowing agent (azodicarbonamide) | 5 | 5 |
| Urea type blowing promoter[1] | 0.5 | 0.5 |
| Zinc white | 2 | 2 |
| Zinc stearate | 0.2 | 0.2 |
| Pigment | 0.3 | 0.3 |
| Crosslinking agent (dicumyl peroxide[2]) | 2 | 1 |
| Foaming and crosslinking conditions | | |
| Temperature (°C) | 150 | 150 |
| Pressure (kg/cm²) | 60 | 60 |
| Time (minute) | 30 | 15 |
| State and physical properties | | |
| Density (g/cm³) | 0.062 | 0.067 |
| Foaming ratio (time) | 15.5 | 14.3 |
| Resilience[3] (%) | 36 | 33 |
| Tensile strength (kg/cm²) | 10.4 | 8.2 |
| Elongation (%) | 170 | 180 |
| Compressive hardness (kg/cm²) | 1.03 | 1.10 |
| Compression set (%) | 2.3 | 2.8 |
| Tear strength (kg/cm²) | 3.8 | 3.9 |
| Change in size by heating (%) | −2.0 | −2.2 |
| Weather resistance | | |
| Rate of change in tensile strength (%) | −6.7 | −12.2 |
| Rate of change in elongation (%) | −17.6 | −22.2 |
| Remarks | Comparative Example | Example |

Notes:
[1]"Cellpaste El." manufactured by Eiwa Kasei Kogyo Kabushiki Kaisha (the same is applied hereinafter).
[2]Diluted with calcium carbonate so that the dicumyl peroxide content was 40 % (The same is applied hereinafter).
[3]Determined according to the procedure of JIS K 6401. Steel ball: ⅝ inch (in diameter) defined in JIS B 1501.

It was understood from the above result that there could be obtained crosslinked foams having the same state and physical properties as those of the foams of polyethylene alone in spite of the fact that the amount of the crosslinking agent and the crosslinking time are halves of those in the case of polyethylene alone, by use of the 1,2-polybutadiene of the present invention.

EXAMPLE 2

The polyethylene used in Example 1, polybutadiene having a cis-1,4-addition unit content of 97.5 % and a 1,2-addition unit content of 1.3 % (referred to hereinafter as cis-1,4-polybutadiene) and the 1,2-polybutadiene Ⓐ used in Example 1 were mixed according to the compounding formulation shown in Table 2 by means of a 10 inch roll, and the resulting mixture was subjected to crosslinking and foaming at a temperature of 170°C and a pressure of 100 kg/cm² for 20 minutes. The properties of the crosslinked foams obtained are shown in Table 2.

Table 2

| Items | Run Nos. | | |
|---|---|---|---|
| Compounding formulation (parts) | 3 | 4 | 5 |
| Polyethylene | 90 | 100 | 90 |
| 1,2-Polybutadiene Ⓐ | — | — | 10 |
| Cis-1,4-polybutadiene | 10 | — | — |
| Blowing agent (azodicarbonamide) | 5 | 5 | 5 |
| Urea type blowing promoter | 5 | 5 | 5 |
| Zinc white | 2 | 2 | 2 |
| Zinc stearate | 0.2 | 0.2 | 0.2 |
| Crosslinking agent (dicumyl peroxide) | 1.5 | 1.5 | 1.5 |
| Properties and state | | | |
| Density (g/cm³) | — | 0.065 | 0.067 |
| Size (mm × mm) | — | 280×280 | 290×290 |
| Appearance[1] | * | Bad | Excellent |
| Remarks | Comparative Example | Comparative Example | Example |

*No crosslinked foam was obtained

Notes
[1] Evaluation of appearance
Excellent: The surface was smooth and the edge continuity was favorable.
Good: There were winkles and sweelings on a part of the surface. The edge continuity was favorable.
Bad: Both the surface smoothness and the edge continuity were bad.
(The same is applied hereinafter.)

As is evident from the above result, there could be obtained no crosslinked foam when cis-1,4-polybutadiene was used in place of the 1,2-polybutadiene.

EXAMPLE 3

Crosslinked foams were prepared from the polyethylene used in Example 2 and the 1,2-polybutadiene A in the same manner as in Example 2 by varying the admixing ratio according to the compounding formulation shown in Table 3. The properties of the crosslinked foams obtained are shown in Table 3.

Table 3

| Items | Run Nos. | | | | | | |
|---|---|---|---|---|---|---|---|
| Compound formulation (parts) | 6 | 7 | 8 | 9 | 10 | 11 | 12 |
| Polyethylene | 100 | 100 | 95 | 90 | 80 | 70 | 60 |
| 1,2-Polybutadiene Ⓐ | 0 | 0 | 5 | 10 | 20 | 30 | 40 |
| Blowing agent (azodicarbonamide) | 5 | 5 | 5 | 5 | 5 | 5 | 5 |
| Urea type blowing promoter | 5 | 5 | 5 | 5 | 5 | 5 | 5 |
| Zinc white | 2 | 2 | 2 | 2 | 2 | 2 | 2 |
| Zinc stearate | 0.2 | 0.2 | 0.2 | 0.2 | 0.2 | 0.2 | 0.2 |
| Crosslinking agent (dicumyl peroxide) | 2.8 | 2.8 | 2.0 | 1.5 | 1.0 | 0.6 | 0.2 |
| Foaming and crosslining conditions | | | | | | | |
| Temperature (°C) | 170 | 170 | 170 | 170 | 170 | 170 | 170 |
| Pressure (kg/cm²) | 100 | 100 | 100 | 100 | 100 | 100 | 100 |
| Time (min) | 20 | 30 | 20 | 20 | 20 | 15 | 15 |
| Properties and state | | | | | | | |
| Density (g/cm³) | 0.065 | 0.068 | 0.066 | 0.067 | 0.075 | 0.076 | 0.077 |
| Size (mm × mm) | 290×290 | 290×290 | 290×290 | 290×290 | 240×240 | 250×250 | 250×250 |
| Appearance | Good | Excellent | Excellent | Excellent | Excellent | Excellent | Excellent |
| Remarks | Comparative Examples | | | | Comparative Examples | | |

The physical properties of the crosslinked foams of Run Nos. 7 and 9 were measured according to the procedure A of JIS K 6767. But the resilience was measured according to the procedure of JIS K 6401. The steel ball used in the measurement was ⅝ inch (in diameter) according to JIS B 1501. The results obtained are shown in Table 4.

Table 4

| Items | Run Nos. | |
|---|---|---|
| Physical Properties | 7 | 9 |
| Resilience (%) | 36 | 35 |
| Tensile strength (kg/cm²) | 10.3 | 10.5 |
| Elongation (%) | 120 | 130 |
| Compressive hardness (kg/cm²) | 1.03 | 1.10 |
| Compression set (%) | 2.3 | 2.5 |
| Tear strength (kg/cm²) | 3.9 | 4.0 |
| Remarks | Comparative Example | Example |

It is seen from the above result that in accordance with the present invention the amount of crosslinking agent used can be reduced to one-half and the time required for crosslinking can be reduced considerably. Furthermore, it is clear that the crosslinked foam obtained has physical properties equal to or better than those of the conventional cross-linked foam.

EXAMPLE 4

A crosslinked foam was prepared from the polyethylene used in Example 2, the 1,2-polybutadiene Ⓐ and, in addition, the 1,2-polybutadiene shown in Table 5 according to the same compounding formulations and foaming conditions as in Example 2. The properties of the crosslinked foam obtained are shown in Table 6.

Table 5

| | | 1,2-Addition unit contents (%) | Intrinsic viscosity [η] 30° toluene (dl/g) | Crystallinity (%) |
|---|---|---|---|---|
| 1,2-Polybutadiene | Ⓑ | 91.5 | 0.86 | 25 |
| " | Ⓒ | 89.7 | 1.85 | 15 |
| " | Ⓓ | 81.7 | 2.05 | 0 |
| " | Ⓧ | 92.4 | 0.10 | 0 |

Table 6

| Compounding formulation (parts) | 13 | 14 | 15 | 16 | 17 |
|---|---|---|---|---|---|
| Polyethylene | 90 | 90 | 90 | 90 | 90 |
| 1,2-Polybutadiene | (A)10 | (B)10 | (C)10 | (D)10 | (X)10 |
| Properties and state | | | | | |
| Density (g/m³) | 0.065 | 0.067 | 0.064 | 0.067 | — |
| Size (mm × mm) | 290×290 | 270×270 | 300×280 | 290×290 | — |
| Appearance | Excellent | Good | Excellent | Good | No cross-liked foam was obtained |
| Remarks | | | Examples | | Comparative Example |

It is seen from the above result that 1,2-polybutadiene is only required to have a high molecular weight and the crystallinity thereof is substantially irrelevant to the result.

What is claimed is:

1. A process for producing a chemically cross-linked polyethylene foam comprising heating a composition consisting essentially of at least one polyethylene, at least one blowing agent, and at least one crosslinking agent to simultaneously foam and cross-linked said composition, wherein said composition further contains 1,2-polybutadiene having a 1,2-addition unit content of at least 70%, a crystallinity of 10 to 30% and an intrinsic viscosity of at least 0.7 dl/g as measured in toluene at 30°C and the ratio of said 1,2-polybutadiene to the polyethylene is 3 to 50% by weight of the former to 97 to 50% by weight of the latter.

2. A process according to claim 1, wherein the 1,2-polybutadiene has a 1,2-addition unit content of at least 85 %.

3. A process according to claim 1 wherein the 1,2-polybutadiene has an intrinsic viscosity of at least 1.0 dl/g.

4. A process according to claim 1, wherein the 1,2-polybutadiene has a crystallinity of 10 to 30 %

5. A process according to claim 1, wherein the 1,2-polybutadiene has a 1,2-addition unit content of at least 85 %, an intrinsic viscosity of at least 1.0 dl/g and a crystallinity of 10 to 30 %.

6. A process according to claim 1, wherein the polyethylene is selected from the group consisting of high density polyethylene, medium density polyethylene, low density polyethylene, chlorinated polyethylene and chlorosulfonated polyethylene.

7. A process according to claim 1, wherein the blowing agent is selected from the group consisting of blowing agents of nitroso type, azo type and aromatic hydrazide type, and inorganic blowing agents.

8. A process according to claim 1, wherein the blowing agent is selected from the group consisting of azodicarbonamide, diazoaminoazobenzene, dinitrosopentamethylene tetramine, N,N'-dimethyl-N,N'-dinitroso terephthalatimide, p,p'-oxy-bis(benzenesulfonyl semicarbazide), azobis(isobutyronitrile), toluenesulfonyl semicarbazide, p,p'-oxy-bis(benzenesulfonyl hydrazide), p,p'-diphenyl bis(sulfonyl hydrazide),toluenesulfonyl hydrazide, benzenesulfonyl hydrazide, m-benzene-bis(sulfonium hydrazide).

9. A process according to claim 1, wherein the blowing agent is selected from the group consisting of sodium bicarbonate, ammonium carbonate, ammonium nitrate and ammonium chloride.

10. A process according to claim 1, wherein the blowing agent is azodicarbonamide.

11. A process according to claim 1, wherein the crosslinking agent is selected from the group consisting of peroxides, azo type compounds and azide type compounds.

12. A process according to claim 1, wherein the crosslinking agent is selected from the group consisting of dicumyl peroxide, 2,5-dimethyl-di-(tert-butyl peroxy)-hexane, 2,5-dimethyl-2,5-di(tert-butyl peroxy)hexine, benzoyl peroxide, 1,7-heptane bissulfonazide, 1,10-decane bissulfonazide, 1,11-undecane bissulfonazide, n-octadecyl azide formate, tetramethylene bisazide formate, m-phenylene diazide formate, m-phenylene diazide, 2,4,6-triazido benzene, azodicarbonamide, diazoaminoazobenzene and azobis(isobutyronitrile).

13. A process according to claim 1, wherein the crosslinking agent is dicumyl peroxide.

14. A chemically crosslinked polyethylene foam obtained by the process of claim 1.

* * * * *